United States Patent Office 2,950,277
Patented Aug. 23, 1960

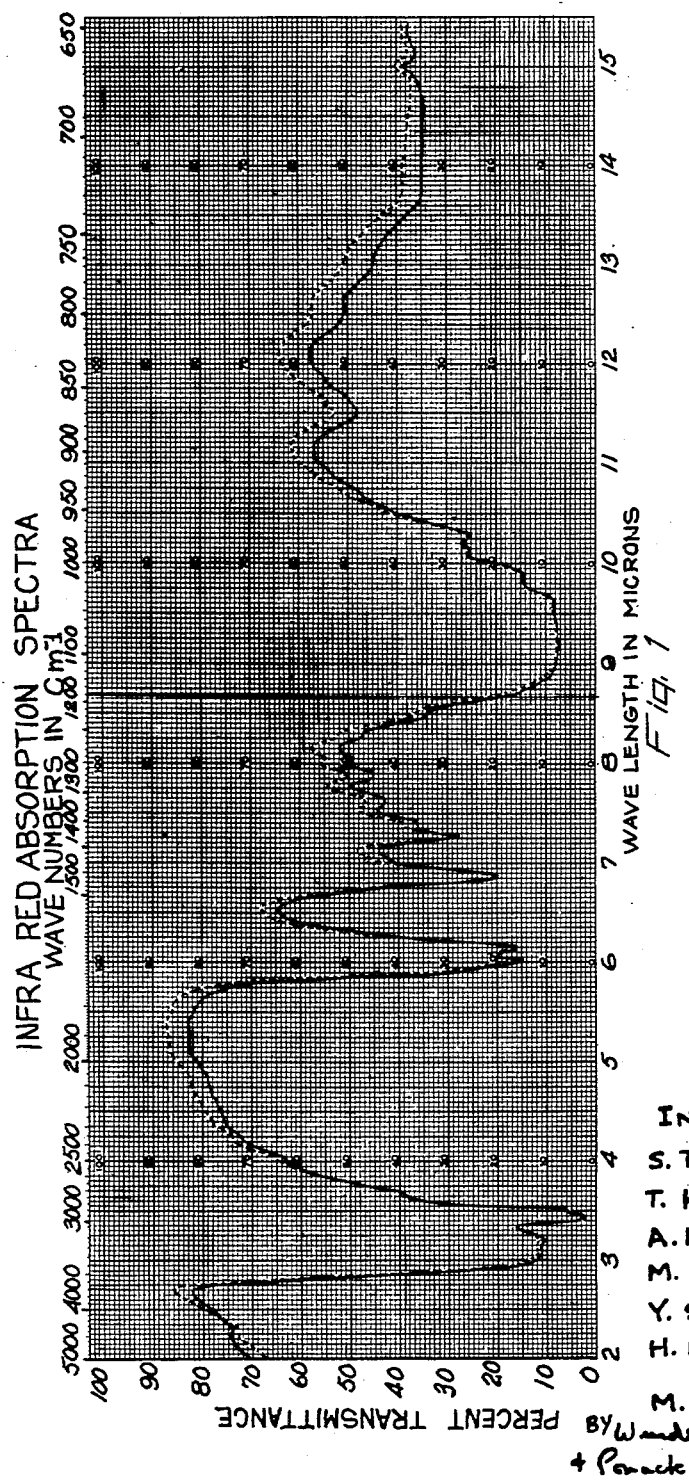

2,950,277

RECOVERY OF DIHYDROSTREPTOMYCIN

Sueo Tatsuoka, Osaka, Tsunaharu Kusaka, Amagasaki, Akira Miyake, Nichinomiya, Michitaka Inoue, Minami-ku, Osaka, Yutaka Shiraishi, Ikuta-ku, Kobe, Hidesuke Iwasaki, Toyonaka, Osaka, and Masahiko Imanishi, Higashiyodogawa-ku, Osaka, Japan, assignors to Takeda Pharmaceutical Industries, Ltd., Doshomachi, Higashi-ku, Osaka, Japan Filed Mar. 21, 1957, Ser. No. 647,682

3 Claims. (Cl. 260—210)

The present invention is concerned with methods for the recovery of dihydrostreptomycin from the fermentation broth in which it has been directly produced by the cultivation of dihydrostreptomycin-producing micro-organisms.

Dihydrostreptomycin is a very useful substance for medical treatment because it shows a strong and wide antibacterial spectrum like streptomycin and is, in addition, less toxic and more stable than the latter. It is also known that dihydrostreptomycin, which resembles streptomycin in antibacterial properties, has the advantage over the latter that it exhibits much lower neurotoxicity. Dihydrostreptomycin has previously been obtained by hydrogenation of the carbonyl radical of streptomycin and placed on the market as its sulfate or hydrochloride. These salts are colorless or white crystalline, or powdery substances. They are odorless or nearly odorless, taste slightly bitter, and their aqueous solutions are levorotatory, and an aqueous solution of the crystal of the sulfate shows $[\alpha]_D^{25} = -88°$ ($c.=1$). It is well known that dihydrostreptomycin shows a wide antibacterial spectrum against gram-positive, gram-negative and acid-fast bacteria.

A method for the direct preparation of dihydrostreptomycin has recently been developed, and is disclosed and claimed in copending application Serial No. 647,681, filed on even date herewith (now U.S. Patent No. 2,931,756). Briefly stated, the said method comprises inoculating a dihydrostreptomycin-producing strain of Streptomyces on a liquid medium and cultivating the said strain aerobically to produce dihydrostreptomycin in an amount sufficient to be collected. The present invention is concerned, more particularly, with recovering the dihydrostreptomycin from the resultant fermentation broth.

In preparing the dihydrostreptomycin according to the said copending application, any strain of Streptomyces may be employed so far as it produces dihydrostreptomycin. For example, a new species separated by the applicants named in the copending application and designated as No. 23572 can be used for the said purpose. This species has the characteristics shown in the following table (the color names marked with Rdg in the table are based on Ridgway's Color Standards and Nomenclature):

STRAIN 23572

| Medium | Cultural characteristics | | | Remarks |
|---|---|---|---|---|
| | Growth | Aerial mycelium and spores | Soluble pigment | |
| Czapek agar | Colorless | White | None | |
| Glucose asparagine agar | do | White to Smoke-gray (Rdg XLVI, 21''''-d) or Vinaceous-buff (Rdg XI, 17' ''-d). | do | Abundantly interspersed with small moist black patches which gradually spread over the whole surface. Reverse Cream-buff (Rdg XXX, 19''-d) or Cartridge-buff (Rdg XXX, 19''-f), later becoming Chamois (Rdg XXX, 19''-b). |
| Starch agar | do | White to Pale smoke gray (Rdg XLVI, 21'' ''-f). | do | Reverse Cream-buff (Rdg XXX, 19''-b). Hydrolysis slight. |
| Calcium malate agar | Colorless, later becoming Buff-yellow (Rdg IV, 19-d). | Scanty White | do | |
| Glycerine nitrate agar | Colorless | do | do | |
| Dextrose nitrate agar | do | do | do | |
| Bouillon agar | do | None | do | |
| Gelatin | do | do | do | Moderate liquefaction. |
| Potato plug | do | White to Smoke gray (Rdg XLVI, 21'' ''-d). | do | Moist black patches observed. |
| Carrot plug | do | do | do | |
| Yeast extract agar | do | White to Light drab (Rdg XLVI, 17'' ''-b). | do | Partially moistened. |
| Whole egg | do | White | do | |
| Milk | do | do | do | Peptonization slowly. |
| Glycerin asperaginate agar | do | White to Smoke gray (Rdg XLVI, 21'' ''-d). | do | |
| Peptone nitrate broth | | | | Nitrate reduction. |

Aerial mycelium of this strain shows spiral, 0.8–1.2μ, conidia oval, 1–1.5μ x 1.5–2μ.

Carbon utilization of the strain No. 23572, measured by the Pridham's method, is as follows:

| | | | | | | |
|---|---|---|---|---|---|---|
| d(+)-Xylose | ++ | d(+)-Raffinose | − | Salicin | ++ |
| l(+)-Arabinose | +++ | Inulin | − | Na-acetate | − |
| l(+)-Rhamnose | +++ | d-Mannitol | +++ | Na-citrate | ± |
| d-Fructose | +++ | d-Sorbitol | − | Na-succinate | + |
| d-Galactose | +++ | Dulsitol | − | Control | − |
| Sucrose | − | dl-Inositol | − | | |
| Maltose | +++ | | | | |
| Lactose | ++ | | | | |

−: No growth.
+: Poor growth.
+++: Good growth.
±: Growth doubtful.
++: Fair growth.

From the characteristics mentioned above, the species is manifestly a new species, and so it was named *Streptomyces humidus* nov. sp. Nakazawa et. Shibata.

The above mentioned *Streptomyces humidus* strain represents only one example of the strains usable in the present invention. Strains belonging to other species also can be used for the same purpose so far as they produce dihydrostreptomycin as a metabolite, even if they do not much resemble *Streptomyces humidus* nov. sp. in properties.

According to the said copending application, various substances which are used as nutrient source for cultivation of general micro-organisms can be employed in the method thereof. As carbon source there are used starch, lactose, sucrose, dextrin, glycerin and maltose for example. And as nitrogen source there are employed organic or inorganic, nitrogen-containing substances such as soy-bean meal, meat extract, peptone, peanut powder, casein, amino acids, yeast, bran, corn-steep liquor, cotton-seed powder, nitrates, urea and ammonium compounds. Also a small amount of inorganic salts and growth-promoting substances may be added to the medium. As other nutrient sources there are used mycelia of a strain belonging to Penicillium or its culture broth for instance. Any culture media suitable for the cultivation of *Streptomyces griseus* may be used. A precursor also may be added if necessary.

The culture medium may be solid or liquid, but an aerobic submerged culture is preferable for industrial purpose.

When *Streptomyces humidus* is used as the dihydrostreptomycin-producing micro-organism and the cultivation is conducted under aerobic submerged conditions, the cultivation is preferably conducted at a temperature of about 24 to 30° C. over a period of 3 to 8 days, but the temperature and the period must be adjusted according to the other culture conditions.

The dihydrostreptomycin thus produced can be collected in an optional purity by means of various physical or chemical methods, utilizing the properties of dihydrostreptomycin.

Isolation of dihydrostreptomycin from a dihydrostreptomycin-containing fermentation broth or from its processed substance was accomplished for the first time by the present inventors.

"Collection" in this specification means to obtain dihydrostreptomycin in an optional state purer than the material in accordance with the purpose of its use.

The physical and chemical methods for purifying dihydrostreptomycin include various means, for example, those which utilize differences between dihydrostreptomycin or its salts and impurities in adsorbability, solubility, distribution coefficient between two solvents and ionic bonding strength.

In the case of liquid culture the accumulation of dihydrostreptomycin reaches several ten to several thousand micrograms per cc., but the dihydrostreptomycin can be effectively separated even from an about 10 γ/cc. solution.

The material may be subjected to the above methods after part or most of impurities has been removed by processes such as change of pH of the composition, formation of salts, precipitation, removal of solid materials, adsorption and extraction with a solvent.

Isolation of dihydrostreptomycin from the culture broth of a dihydrostreptomycin-producing micro-organism or its processed substance has never been reported. Such a material of course contains various impurities, such as carbohydrates, protein substances, salts, animal and vegetable substances, mycelia of micro-organisms and their metabolites. Each of the impurities includes the following substances:

Carbohydrate: starch, sugars, water-soluble carbohydrates, etc.

Protein substance: amino acids, casein, meat extract, protein, peptone, etc.

Animal and vegetable substance: protein substances, fats, fatty acids, lipoids, cellulose, etc.

Salt: salts of ammonium and amines, alkali metals, calcium, magnesium, iron, manganese, copper, zinc, etc.

Metabolites of micro-organism: enzymes, protein substances, sugars, polyhydric alcohols, fatty acids, etc.

Besides these substances, synthetic compounds such as urea may be present.

Thus, the composition of impurities in the material may be very complicated, but those in the pre-processed material varies in quality and quantity with the extent and kind of the process. In the latter case, however, other impurities such as a pH-regulating agent, precipitant, adsorbent, etc. may be present.

In the present invention, dihydrostreptomycin is collected from the materials by various means utilizing difference between dihydrostreptomycin and the co-existing impurities in physico-chemical properties.

One of the means utilizes difference between dihydrostreptomycin and impurities in solubility. In the liquid culture a dihydrostreptomycin solution is obtained by filtering the broth because it accumulates preferably in the liquid part. But a minor portion of the active compound is found in the solid part, and it may be collected by such a method as extraction with hot water. In this case, impurities of protein series can be eliminated by adjusting pH to isoelectric point of protein or by adding materials which precipitate with the impurities, at the same time with, or before or after, the removal of the mycelia. If the pH of the fermentation broth is high, addition of an acid substance is convenient to precipitate protein more easily. If the concentration of dihydrostreptomycin in the solution is suitable, the antibiotic can be precipitated merely by adding a suitable precipitant.

When the concentration of dihydrostreptomycin is not sufficient, part of the solvent is evaporated. As precipitant are used, for example, phosphotungstic acid, helianthine, alkyl or aralkyl sulfonic acids, acid azo-compounds and polyhalophenol compounds. They all form salts with dihydrostreptomycin. Many other precipitants may be used, and most of them are acid compounds having carboxylic radical. In some cases the salt of dihydrostreptomycin thus formed may be double or complex salt. As will be described later, an ion-exchanger also can be used as a kind of precipitant. To expedite the precipitation of the active compound or impurities, salting out may be used if necessary.

In the case of solid culture, the solid material is extracted with water, an aqueous solvent or other suitable solvent to obtain a solution of dihydrostreptomycin. If the fermentation broth is pre-processed into a solid material, this can be worked up as above, but in this case the extraction is conducted at a suitable pH.

Another means for the separation of dihydrostreptomycin consists in utilizing differences between the active compound and impurities in adsorbability. Dihydrostreptomycin in the culture filtrate, for example, is adsorbed by the addition of a suitable adsorbent. Adsorption chromatography may be used if necessary. As adsorbents there are employed, for example, active carbon, alumina and silica gel. Separation of the adsorbent leaves the greater part of impurities in the liquid portion. The adsorbent is then eluted with a suitable solvent, leaving non-elutable impurities in the adsorbent. The elution is generally conducted with an acid solvent. Chromatography effects even more exact separation.

Difference between the active compound and impurities in distribution coefficient between two solvents is also utilized for the separation. Water or an aqueous solvent and an organic solvent immiscible with the former are used as the solvents. In this case, the active compound is apt to be distributed into the aqueous solvent when the solvents are strongly acid. On the other hand, when the solvents are neutral or basic, and a higher fatty acid, picric acid or the like coexists, the active compound transfers into the organic solvent layer. Accordingly, it is possible to take up the active compound in the material into an organic solvent and then transfer it into water or an aqueous solvent. As organic solvents are used, for example, butanols, pentanols, phenols, lower fatty acid esters, methyl isobutyl ketone, diethylether, and halohydrocarbon such as chloroform, carbon tetrachloride. This method may be conducted in the form of distribution chromatography or counter current distribution method.

The separation may also be conducted by utilizing difference between the active compound and impurities in ionic bonding strength. This is effected, for example, by bringing a solution of the active compound in contact with an ion-exchanger. In this case, an anion-exchanger adsorbs anionic impurities, leaving the active compound in the solution, while a cation-exchanger adsorbs the active compound. In the latter case, cationic impurities are also adsorbed, but this is minimized by using a suitable ion-exchanger. The resin of sulfonic acid type easily adsorbs impurities, but the resin of carboxylic acid type has little such a tendency. Addition of the ion-exchanger may be effected by batch method, but use of a column of the resin is convenient in many cases. This method can be applied to a dilute solution of the active compound, such as the culture filtrate.

Dialysis may be employed for removing impurities with large molecular weight, but this process requires complicated procedures.

The above-mentioned means are used separately or in combination according to the quality of the material and purpose of the use of the product. Other operations may be carried out between or before or after the above means. For example, when the material is a fermentation broth, it is filtered to remove solid materials or substances precipitated after the cultivation. The active compound in the filtrate is adsorbed in a cation-exchanger and then eluted with an acid solvent. Thus a concentrated solution of the active compound containing a small quantity of impurities is obtained. The solution is further concentrated if necessary and subjected to adsorption chromatography to eliminate almost all the impurities. On the other hand, the active compound in the concentrated solution may be precipitated with a suitable precipitant. The precipitate is then dissolved in a suitable organic solvent and an acid is added, whereupon the corresponding acid salt of dihydrostreptomycin is obtained. If the product is recrystallized, the acid salt is obtained in almost pure state.

Throughout all the means, such procedures as filtration, washing, heating, cooling, mixing, distillation, evaporation, drying, may be employed separately or in combination.

In order to prevent decomposition of the active compound, all the operations are conducted under not extremely acid or alkaline conditions. Heating may be applied if necessary, but it is preferable not to heat too long. Unlike many other antibiotics, dihydrostreptomycin is comparatively stable in the fermentation broth, so all the operations can be effected without difficulty.

The obtained products are identical with authentic dihydrostreptomycin, or the corresponding salts. Thus, the infra-red absorptive spectrum of the sulfate of "Antibiotic 23572" is in complete accord with that of authentic dihydrostreptomycin sulfate. The said products also coincide with authentic dihydrostreptomycin in all other respects, e.g. as to ultra-violet spectra, analytical values, chemical and physical properties, such as melting point, response to maltol reaction, response to Sakaguchi reaction, antibacterial potency to B. subtilis, chemotherapeutic effect, antibacterial spectrum, etc. Thus e.g. the sulfate of antibiotic 23572 was compared with the commercial dihydrostreptomycin sulfate as to weight for causing complete inhibition of test micro-organisms to give the following results:

ANTIBACTERIAL SPECTRUM

| Micro-organism | Sulfate of Antibiotic 23572, mcg./ml. | A commercial dihydrostreptomycin sulfate, mcg./ml. |
| --- | --- | --- |
| Staphyloccus aureus Terajima | 1 | 1 |
| Bacillus subtilis (PCI-219) | 0.5 | 0.5 |
| Salmonella typhosa | 64 | 64 |
| Shigella dysenteriae | 1 | 1 |
| Vibrio cholerae | 8 | 8 |
| Proteus vulgaris | 8 | 8 |
| Escherichia coli | 4 | 4 |
| Pseudomonas aeruginosa | 32 | 32 |
| Aspergillus niger | >100 | >100 |
| Penicillium notatum | >100 | >100 |
| Saccharomyces cerevisiae | >100 | >100 |
| Candida albicans | >100 | >100 |
| Mycobacterium 607 | 2.0 | 2.0 |
| Mycobacterium avium | 1.0 | 1.0 |

The foregoing procedures are described in more detail in the following examples, but these are given by way of illustration and not for purposes of limitation. In these examples, the antibiotic potency is assayed by "cylinder-plate method" using Bacillus subtilis (PCI-219) as the test organism except when the assay method is particularly set forth. The first example sets forth a representative manner for the direct preparation of the dihydrostreptomycin according to the aforesaid copending application. The other examples are representative of embodiments of the present invention.

The single figure accompanying this specification shows the spectrum of antibiotic 23572 (solid line) in comparison with that of dihydrostreptomycin (dotted line). (Each spectrum was observed on its sulfate in Nujol mull, respectively.)

EXAMPLE 1

Medium: Percent by weight
Glucose _____ 2.0
Meat extract _____ 0.6
Peptone _____ 1.0
NaCl _____ 0.6
$CaCO_3$ _____ 0.6
pH, 7.0.

A Streptomyces humidus strain, e.g. No. 23572, was subjected to aerobical tank culture for 96 hours. To 700 liters of the culture filtrate (pH 8.5; potency 35 u./cc. (dilution unit) against E. coli) was added 7 kg. (1%) of active carbon, and the mixture was stirred for 30 minutes to adsorb the active compound. The active carbon was eluted with 10 times its volume of methanolic hydrogen chloride for 30 minutes at pH 2.0 to obtain 140 liters of the eluate (potency 100 u./cc. (dilution unit)). The elution was repeated again to obtain ca. 70 liters of the eluate (potency 35 u./cc. (dilution unit)). The combined eluates were neutralized with N-NaOH to pH 6.5 and concentrated in vacuo at low temperature to about 300 cc. During the process the separated sodium chloride was removed now and then. 3 liters of anhydrous acetone was added to the concentrated solution, and the precipitated active compound was dried in vacuo to give white powder. The yield was 147 g. or 60% (potency 100 u./mg. (dilution unit)). The product was negative to maltol reaction but positive to Sakaguchi reaction.

EXAMPLE 2

Purification by ion-exchanger (a) 500 liters of the culture filtrate (pH 7.7; potency 350 u./cc. (dilution unit) against E. coli) obtained as in Example 1 was passed through a tower packed with 30 liters of Amberlite IRC–50 (H-type) at a rate of 1.8 liters per minute. The potency of the effluent was lower than 10 u./cc. (dilution unit) against *E. coli*. The resin was washed with water, eluted with 0.5 N-HCl, and 36 liters of the colored eluate (potency 3500 u./cc. (dilution unit) against *E. coli*) was collected. The eluate was adjusted to pH 6.5 with N-NaOH and concentrated to 1 liter (potency 160,000 u./cc. (dilution unit) (91.5%)) at low temperature under reduced pressure, removing the separated sodium chloride occasionally.

(b) To 748 liters of the culture filtrate (content of dihydrostreptomycin, about 2200 mcg./ml.) obtained as in Example 1 was added 4.1 kg. of oxalic acid, and the resulting precipitate was removed by the De Laval separator. The pH was adjusted to about 7.0 with sodium hydroxide solution and the resulting precipitate was removed again. The solution was then passed through a tower packed with 6.3 liters of Amberlite IRC–50 (Na-type) at a rate of 40 liters per hour, whereupon the effluent showed only 12–6 mcg./ml. potency. The resin was washed with water and the active compound was eluted by passing 4% hydrochloric acid through the tower at a rate of 3 liters per hour.

20 liters of the eluate thus obtained was neutralized by addition of Amberlite IR–45 (OH-type) or Amberlite IRA–400 (OH-type), and was concentrated to 2.5 liters (potency 368,000 mcg./cc.) at low temperature under reduced pressure.

EXAMPLE 3

*Extraction with organic solvent*

To 1 liter of the culture filtrate (potency 1001 mcg./ml. against *B. subtilis*) obtained as in Example 2(b) was added 400 cc. of n-butanol (or iso-amyl alcohol) containing 3% of lauric acid, the aqueous layer was adjusted to pH 7.5 and the mixture was shaken for 20 minutes. After separation of the butanol (or iso-amyl alcohol) layer the same extraction was repeated once more. The combined butanol (or iso-amyl alcohol) solutions were shaken with dilute sulfuric acid and water in such a way that the resulting aqueous layer reached 120 cc. and its pH was 2.0. After repeating the same extraction again, the combined extracts were shaken with ether to remove the lauric acid therein. The potency of the resulting solution (250 cc.) was 2891 mcg./ml. against *B. subtilis*, or 72.5% in the yield.

EXAMPLE 4

*Chromatography on active carbon*

1 liter of a solution obtained as in Example 2(a) (potency 160,000 u./cc. (dilution unit) against *E. coli*) was adjusted to pH 3.5 with N-HCl and passed through a tower (8 cm. in diameter, 50 cm. in height) packed with 500 g. of active carbon impregnated with water of pH 3.5. The tower is treated with distilled water adjusted to pH 3.5 with hydrochloric acid. The effluent was divided in 300 cc. portions. The fractions 1–11 contained sodium chloride and impurities, and the others the active compound as shown below:

| Fraction No. | Sakaguchi reaction | Potency against *E. coli* (u./cc.) (dilution unit) |
|---|---|---|
| 12 | ++ | 15,000 |
| 13–21 | +++ | 30,000 |
| 22 | +++ | 5,000 |
| 23–27 | +++ | 3,000 |
| 28, 29 | ++ | 3,000 |

The fractions 13–21 were combined, adjusted to pH 6.5 by the addition of Amberlite IRA–400 (OH-type) and concentrated at low temperature under reduced pressure. To the concentrated solution was added ten times its volume of anhydrous acetone, and the resulting precipitate was separated by decantation and dried to obtain 101 g. of the hydrochloride as a colorless amorphous substance (783.3 mcg./mg. as dihydrostreptomycin). To a solution of 10 g. of the product in 50 cc. of water was added a solution of 6 g. of $MgSO_4.7H_2O$ in 7 cc. of water. The mixture was adjusted to pH 6.0 with dilute sulfuric acid and filtered, and methanol was added dropwise with stirring until turbidity was formed, keeping the temperature of the mixture at 50–55° C. Some pieces of crystals of dihydrostreptomycin sulfate were added to the turbid solution and left standing at 50–55° C., when the solution separated crystals soon (ca. 5 minutes) and at the same time became clear. Methanol was further added until the solution became a little turbid and the mixture was left standing as above. In this way, the process was repeated until amount of the methanol added reached 100 cc. and the mixture became clear. Then the temperature of the mixture was reduced to room temperature, and the crystals were filtered and then stirred in 50% methanol for 5 minutes. The crystals were filtered, washed with methanol and dried at 50° C. under reduced pressure. The yield was 8.9 g. (738 mcg./mg. as dihydrostreptomycin). Several recrystallizations heightened the potency to about 780 mcg./mg. as dihydrostreptomycin. It was found that in the above process, $MgSO_4$ exhibits the action to destroy histamine-like substance contained in the material.

EXAMPLE 5

5 cc. of the concentrate of the active compound obtained in Example 2(b) (potency 368,000 mcg./ml.) was diluted with water to 50 cc., and a warm saturated solution of methyl orange was added until no more precipitate came out. After cooling, the precipitate was filtered and recrystallized repeatedly from aqueous methanol, whereupon 2.1 g. of the helianthate of the active compound was obtained. A suspension of the helianthate in a small amount of water was adjusted to pH 2.0 with dilute sulfuric acid, when the active compound dissolved, forming its sulfate. The solution was filtered to remove the separated methyl orange and treated with a small amount of active carbon. To the resulting colorless solution was added 10 times its volume of anhydrous acetone, whereupon 0.6 g. of the sulfate of the active compound separated out.

A specimen of strain 23572 has been filed with Institute for Fermentation, Osaka (IFO), a Japanese culture collection, and its deposit number is IFO–3520.

A specimen of the said strain 23572 has also been deposited with the American Type Culture Collection, ATCC No. 21760.

What is claimed is:

1. A process for recovering dihydrostreptomycin as its acid salt from a fermentation broth of *Streptomyces humidus*, which comprises the following steps: filtering the said fermentation broth, passing the latter through a weakly acidic ion-exchange resin, washing the resin with water, eluting the resultant adsorbed dihydrostreptomycin from the resin with an acid, concentrating the eluate, adjusting the concentrate to pH 3.5, passing the thus-prepared solution through active carbon, eluting the so-adsorbed dihydrostreptomycin from the active carbon by means of dilute hydrochloric acid, adjusting the eluate to pH 6.5, concentrating the resultant solution, precipitating the so-produced hydrochloride, dissolving the latter in water, treating the so-obtained aqueous solution of the hydrochloride with an aqueous solution of $MgSO_4$, adjusting the mixture to pH 6.0 with dilute sulfuric acid, and isolating the so-produced dihydrostreptomycin sulfate.

2. A process according to claim 1, wherein the precipitation of dihydrostreptomycin hydrochloride is effected by means of acetone.

3. A process according to claim 1, wherein the isolation of dihydrostreptomycin sulfate is effected by means of methanol.

References Cited in the file of this patent

UNITED STATES PATENTS

| | | |
|---|---|---|
| 2,493,489 | Langlykke, et al. | Jan. 3, 1950 |
| 2,501,014 | Wintersteiner, et al. | Mar. 21, 1950 |
| 2,521,770 | Babson, et al. | Sept. 12, 1950 |
| 2,528,188 | Taylor | Oct. 31, 1950 |
| 2,827,417 | Friedman | Mar. 28, 1958 |
| 2,868,779 | Bartels | Jan. 13, 1959 |

UNITED STATES PATENT OFFICE
CERTIFICATION OF CORRECTION

Patent No. 2,950,277　　　　　　　　　　　　August 23, 1960

Sueo Tatsuoka et al.

It is hereby certified that error appears in the above numbered patent requiring correction and that the said Letters Patent should read as corrected below.

In the heading to the printed specification, between lines 10 and 11, thereof, insert -- Claims priority, application Japan March 28, 1956 --.

Signed and sealed this 25th day of April 1961.

(SEAL)
Attest:

ERNEST W. SWIDER
Attesting Officer

DAVID L. LADD
Commissioner of Patents